United States Patent [19]
Nakae et al.

[11] Patent Number: 5,719,212
[45] Date of Patent: Feb. 17, 1998

[54] POWDER COATING COMPOSITION OF EPOXY-CONTAINING ACRYLIC, POLYCARBOXYLIC ACID AND ANTIOXIDANT

[75] Inventors: Yasuhiko Nakae, Kyoto; Hitoshi Nakatsuka, Neyagawa; Koichi Inoue, Amagasaki, all of Japan

[73] Assignee: Nippon Paint Co., Ltd., Osaka, Japan

[21] Appl. No.: 740,349

[22] Filed: Nov. 8, 1996

[30] Foreign Application Priority Data

Nov. 9, 1995 [JP] Japan ................................. 7-291078

[51] Int. Cl.$^6$ .................................................. C08K 63/00
[52] U.S. Cl. ........................ 523/451; 523/453; 523/455; 523/456
[58] Field of Search ............................ 523/451, 453, 523/455, 456

[56] References Cited

U.S. PATENT DOCUMENTS

| | | | |
|---|---|---|---|
| 5,034,432 | 7/1991 | Ueno et al. | 523/221 |
| 5,266,652 | 11/1993 | Toyoda et al. | 525/386 |
| 5,270,391 | 12/1993 | Miyazaki et al. | 525/194 |
| 5,468,813 | 11/1995 | Uenaka et al. | 525/386 |

FOREIGN PATENT DOCUMENTS

| | | |
|---|---|---|
| 55-140060 | 11/1980 | Japan. |
| 56-20072 | 2/1981 | Japan. |
| 63-165463 | 7/1988 | Japan. |
| 4-332748 | 11/1992 | Japan. |

*Primary Examiner*—Robert E. Sellers
*Attorney, Agent, or Firm*—Townsend&Banta

[57] ABSTRACT

Disclosed is an acid-epoxy curing type powder coating composition which forms a coated film having excellent yellow resistance and appearance. The powder coating composition comprises:

(A) an epoxy group-containing acrylic resin prepared by polymerizing the monomer mixture which comprises,
   (a) 35 to 65% by weight of an epoxy group-containing ethylenically unsaturated monomer, and
   (b) remainder amount of an ethylenically unsaturated monomer which is different from the epoxy group-containing ethylenically unsaturated monomer;
(B) a polycarboxylic acid; and
(C) an antioxidant having a melting point of from 50° to 140° C.

13 Claims, No Drawings

POWDER COATING COMPOSITION OF EPOXY-CONTAINING ACRYLIC, POLYCARBOXYLIC ACID AND ANTIOXIDANT

FIELD OF THE INVENTION

The present invention relates to a curable resin composition which is suitable for an automotive top coating composition and a coil coating composition.

BACKGROUND OF THE INVENTION

In recent years, it is generally desired to have a coating composition which releases a decreased amount of solvent in the air. Therefore, powder coating compositions are attracting notice in the art.

On the other hand, there has recently been the problem that of coated films being damaged by acid rain, and a coated film having good acid resistance is desired. The coated film obtained by a curing system of acid-epoxy type, generally has good acid resistance.

However, a coating of an acid-epoxy type readily colors when it is cured by baking. Thus, a curing system of acid-epoxy type is difficult to be applied on pail colors, such as white and mica.

SUMMARY OF THE INVENTION

An object of the present invention is to provide an powder coating composition of acid-epoxy curing type which forms a coated film having excellent yellow resistance and appearance, and a method for forming a coated film using the same.

That is, the present invention provides a powder coating composition comprising:

(A) an epoxy group-containing acrylic resin prepared by polymerizing the monomer mixture which comprises,
  (a) 35 to 65% by weight of an epoxy group-containing ethylenically unsaturated monomer, and
  (b) remainder amount of an ethylenically unsaturated monomer which is different from the epoxy group-containing ethylenically unsaturated monomer;

(B) a polycarboxylic acid; and (C) an antioxidant having a melting point of from 50° to 140° C.

DETAILED DESCRIPTION OF THE INVENTION

Epoxy group-containing acrylic resin (A)

The epoxy group-containing acrylic resin (A) employed in the present invention is prepared by polymerizing the monomer mixture which comprises an epoxy group-containing ethylenically unsaturated monomer (a), and an ethylenically unsaturated monomer (b) which is different from the epoxy group-containing ethylenically unsaturated monomer (a).

The wording "monomer" means "ethylenically unsaturated monomer" hereinafter.

The epoxy group-containing monomer (a) is the compound which has an epoxy group, and a copolymerizable double bond. The monomer (a) has relatively low molecular weight, that is, it has generally not more than 10, preferably not more than 8 carbon atoms.

Examples of the monomer (a) include glycidyl acrylate, glycidyl methacrylate, α-methyl glycidyl acrylate, and α-methyl glycidyl methacrylate. Two or more of these monomers may be used in combination.

The monomer (b) which is different from the epoxy group-containing monomer (a), is the compound which has a copolymerizable double bond, and is compatible with an epoxy group. The monomer (b) also has relatively low molecular weight.

Examples of the monomer (b) include alkyl esters of (meth)acrylic acid such as methyl (meth)acrylate, ethyl (meth)acrylate, butyl (meth)acrylate, isobutyl (meth) acrylate t-butyl (meth)acrylate 2-ethylhexyl (meth)acrylate, lauryl (meth)acrylate, tridecyl (meth)acrylate, stearyl (meth) acrylate, and cyclohexyl (meth)acrylate; hydroxyalkyl esters of (meth)acrylic acid such as hydroxyethyl (meth)acrylate, and hydroxypropyl (meth)acrylate; styrene; vinyl toluene; α-methylstyrene; acrylonitrile; methacrylonitrile; acrylamide; dimethylacrylamide; and dialkyl esters of unsaturated dibasic acid. Two or more of these monomers may be used in combination.

The monomer (a) is contained in the monomer mixture in an amount of from 35 to 65% by weight, preferably 40 to 60% by weight, more preferably 45 to 60% by weight based on the total amount of the monomer mixture. If the content of the monomer (a) is less than 35% by weight, curability of the resulting coating composition may become poor. If the content is more than 65% by weight, clearness of the resulting coated film may become poor and the appearance thereof may become defective.

It is preferred that the monomer mixture contains 0.1 to 10% by weight of isobutyl methacrylate as the monomer (b). This is because the blocking resistance of the resulting powder coating composition is improved.

The monomer mixture is polymerized according to any of the conventional procedures well known to those skilled in the art, to prepare the epoxy group-containing acrylic resin (acrylic polyepoxide) (A).

The resulting epoxy group-containing acrylic resin (A) has a solubility parameter of generally 11.0 to 11.6, preferably 11.0 to 11.4. The powder coating composition may have improved curability at low temperature, and the coated film may have improved clearness, by employing such an epoxy group-containing acrylic resin (A). The solubility parameter (It is referred to as "SP value" hereinafter.) may be measured according to the turbid point titration method described in Suh & Clarke, J. Polymn. Sci., A-1, 5, pages 1671–1681, 1967. For example, the method may be carried out using a tetrahydrofuran (THF) solvent at a measuring temperature of 20° C.

The epoxy group-containing acrylic resin (A) has a glass transition temperature of preferably 20° to 60° C., more preferably 35° to 58° C. If the glass transition temperature is less than 20° C., blocking resistance of the resulting powder coating composition may become poor. If the glass transition temperature is more than 60° C., appearance of the resulting coated film may become defective.

Polycarboxylic acid (B)

The polycarboxylic acid (B) employed in the present invention is the compound which has not less than 2 carboxyl groups. This is the component which cures a coating of the powder coating composition. The polycarboxylic acid (B) reacts with epoxy groups contained in the epoxy group-containing acrylic resin (A). Thereby, the epoxy group-containing acrylic resin (A) is crosslinked.

Examples of the polycarboxylic acid (B) include aliphatic dibasic acids such as adipic acid, sebacic acid, azelaic acid, decanedicarboxylic acid, hexadecanedicarboxylic acid, eicosanedicarboxylic acid, and tetraeicosanedicarboxylic acid; aromatic polycarboxylic acids such as isophthalic acid, and trimellitic acid; and alicyclic dibasic acids such as hexahydrophthalic acid, and tetrahydrophthalic acid. Preferred polycarboxylic acid (B) among them is decanedicarboxylic acid.

Antioxidant (C)

The antioxidant (C) employed in the present invention is not particularly limited, and may be any which is employed conventionally by those skilled in the art. Preferred antioxidant (C) has a melting point of generally 50° to 140° C., preferably 75° to 125° C. If the melting point of the antioxidant (C) is less than 50° C., blocking resistance of the resulting coated film becomes poor, and if it is more than 140° C., the antioxidant becomes difficult to melt at a usual baking temperature, the agglomerates thereof are left on the coated surface, and appearance of the coated film may become defective.

The antioxidant (C) is preferably at least one selected from the group consisting of a phenol antioxidant, a phosphite antioxidant and a thioether antioxidant. Particularly preferred is the phosphite antioxidant.

The antioxidants of each class may be used alone, but it is preferred that two or more classes of these antioxidants are used in combination in order to prohibit the yellowing of the polymer, because the mechanism for prohibiting the oxidation is different depending on the class of antioxidant used. Preferred is a combination of the phenol antioxidant and the phosphite antioxidant, or a combination of the phenol antioxidant and the thioether antioxidant. Particularly preferred combination for improving the yellow resistance is a combination of the phenol antioxidant and the phosphite antioxidant.

Examples of the phenol antioxidant include those commercially available as Sumilizer BHT, Sumilizer S, Sumilizer BP-76, Sumilizer MDP-S, Sumilizer BP-101, Sumilizer GA-80, Sumilizer BBM-S, Sumilizer WX-R, Sumilizer NW, Sumilizer GM, Sumilizer GS, and Sumizal BHT (2,6-di-t-butyl-4-methylphenol) from Sumitomo Kagaku K.K.; as Adekastab AO-20, Adekastab AO-30, Adekastab AO-40, Adekastab AO-50 (n-octadecyl-3-(3,5-di-t-butyl-4-hydroxyphenyl)propionate), Adekastab AO-60 (tetrakis-{methylene-3-(3,5-di-t-butyl-4-hydroxyphenyl) propionate}methane), Adekastab AO-75, Adekastab AO-80 (3,9-bis-[2-{3-(3-t-butyl-4-hydroxy-5-methylphenyl) propionyloxy}-1,1-dimethylethyl]-2,4,8,10-tetraoxaspiro{5,5}undecane), Adekastab AO-330, Adekastab AO-616, Adekastab AO-635, Adekastab AO-658, Adekastab AO-15, Adekastab AO-18, Adekastab 328, Adekastab AO-37 from Asahi Denka K.K.; as Sanol LS 2626 (1-[2-{3-(3,5-di-t-butyl-4-hydroxyphenyl) propionyloxy}ethyl]-4-{3-(3,5-di-t-butyl-4-hydroxyphenyl) propionyloxy}-2,2,6,6-tetramethylpiperidine) from Sankyo K.K.; and the like.

Preferred phenol antioxidants are 2,6-di-t-butyl-4-methylphenol having a melting point of 71° C., n-octadecyl-3-(3,5-di-t-butyl-4-hydroxyphenyl)propionate having a melting point of 50° C. tetrakis-{methylene-3-(3,5-di-t-butyl-4-hydroxyphenyl)propionate}methane having a melting point of 115° C., 3,9-bis-[2-{3-(3-t-butyl-4-hydroxy-5-methylphenyl)propionyloxy}-1,1-dimethylethyl]-2,4,8,10-tetraoxaspiro{5,5}undecane having a melting point of 125° C., and 1-[2-{3-(3,5-di-t-butyl-4-hydroxyphenyl) propionyloxy}ethyl]-4-{3-(3,5-di-t-butyl-4-hydroxyphenyl) propionyloxy}-2,2,6,6-tetramethylpiperidine having a melting point of 135° C.

Examples of the phosphite antioxidant include those commercially available as Sumilizer TNP, Sumilizer TPP-R, Sumilizer P-16 from Sumitomo Kagaku K.K.; and as Adekastab PEP-2, Adekastab PEP-4C, Adekastab PEP-8, Adekastab PEP-8F, Adekastab PEP-8W, Adekastab PEP-11C, Adekastab PEP-24G, Adekastab PEP-36, Adekastab HP-10, Adekastab 2112, Adekastab 260, Adekastab P, Adekastab QL, Adekastab 522A, Adekastab 329K, Adekastab 1178, Adekastab 1500, Adekastab C, Adekastab 135A, Adekastab 517, Adekastab 3010, Adekastab TPP from Asahi Denka K.K.; and the like.

Preferred phosphite antioxidants are the compounds represented by the formula:

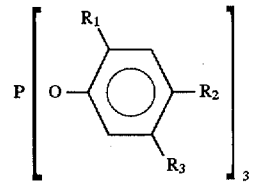

wherein, $R_1$ represents a hydrogen atom, a t-butyl group, or a phenyl group, $R_2$ represents a hydrogen atom, a methyl group, t-butyl group, or a phenyl group, and $R_3$ represents a hydrogen atom, or a methyl group.

Particularly preferred are tris-(4-t-butylphenyl)phosphite having a melting point of 75° C., tris-(2-t-butyl-4-methylphenyl)phosphite having a melting point of 110° C., tris-(2-t-butyl-5-methylphenyl)phosphite having a melting point of 111° C., tris-(2-phenylphenyl)phosphite having a melting point of 96° C., and tris-(4-phenylphenyl)phosphite having a melting point of 92° C.

Examples of the thioether antioxidant include those commercially available as Sumilizer TPL-R, Sumilizer TPM, Sumilizer TPS, Sumilizer TP-D, Sumilizer TL, Sumilizer MB from Sumitomo Kagaku K.K.; and as Adekastab AO-23, Adekastab AO-412S, Adekastab AO-503A from Asahi Denka K.K.; and the like.

Preferred thioether antioxidants are dilauryl 3,3'-thiodipropionate, ditridecyl 3,3'-thiodipropionate, dimyristyl 3,3'-thiodipropionate, distearyl 3,3'-thiodipropionate, bis-(2-methyl-4-{3-n-alkylthiopropionyloxy}-5-t-butylphenyl)sulfide, and pentaerythritol-tetrakis-(β-lauryl thiopropionate), 2-mercaptobenzimidazol, and the like.

Particularly preferred thioether antioxidants are dilauryl 3,3'-thiodipropionate, ditridecyl 3,3'-thiodipropionate, distearyl 3,3'-thiodipropionate, and bis-(2-methyl-4-{3-n-alkylthiopropionyloxy}-5-t-butylphenyl)sulfide.

Thus obtained epoxy group-containing acrylic resin (A), polycarboxylic acid (B), and antioxidant (C) were formulated to obtain the powder coating composition of the present invention.

The epoxy group-containing acrylic resin (A), and the polycarboxylic acid (B) are formulated in an amount so that the molar ratio of the epoxy group contained in the epoxy group-containing acrylic resin (A) to the carboxyl group contained in the polycarboxylic acid (B) becomes 10/10 to 10/5, preferably 10/8 to 10/6. If the molar ratio is less than 10/10, the gloss of the resulting coated film may become poor, and it is more than 10/5, the curability of the resulting powder coating composition may become poor.

The antioxidant (C) is contained in an amount of 0.1 to 10 parts, preferably 0.5 to 8 parts, more preferably 1 to 7 parts by weight, based on 100 parts of the total weight of the epoxy group-containing acrylic resin (A) and the polycarboxylic acid (B). If the content of the antioxidant (C) is less than 0.1 parts by weight, the oxidation inhibiting ability may become insufficient, and if it is more than 10 parts by weight, the water resistance and blocking resistance of the resulting coated film may become poor.

Surface modifier (D)

The powder coating composition of the present invention may optionally contain a surface modifier (D). The surface modifier (D) is the additive which promotes fusing of each particles of the powder coating composition, and improves clearness of the resulting coated film.

A polymer which has good compatibility with particles of the powder coating composition may be employed as the surface modifier. The polymer employed is not particularly limited, but those having a SP value of from 10.4 to 11.0, preferably 10.6 to 10.9, and a number average molecular weight of 2500 to 9000, preferably 3000 to 7000, are preferred. The polymer having such a SP value, generally show good compatibility with epoxy group-containing acrylic resin, and improves clearness of the resulting coated film. When the molecular weight of the polymer, which is employed as the surface modifier, is less than 2500, the blocking resistance of the resulting powder coating composition becomes poor, and the surface modifying ability may become insufficient. If the molecular weight is more than 9000, the smoothness of the resulting coated film may be ruined.

Specific examples of the polymer include acrylic polymers. For example, a polymer obtained by polymerizing at least one monomers selected from methyl (meth)acrylate, ethyl (meth) acrylate, butyl (meth) acrylate, isobutyl (meth) acrylate, t-butyl (meth)acrylate, 2-ethylhexyl (meth) acrylate, cyclohexyl (meth)acrylate, stearyl (meth)acrylate, and lauryl (meth)acrylate can be used.

The surface modifier (D) is preferably included in the powder coating composition of the present invention in an amount of from 0.1 to 4 parts, preferably 0.3 to 2 parts by weight, based on 100 parts of the total weight of the epoxy group-containing acrylic resin (A) and the polycarboxylic acid (B). If the content of the surface modifier (D) is less than 0.1 parts by weight, the smoothness of the resulting coated film may be ruined. If it is more than 4 parts by weight, the blocking resistance of the resulting coated film may become poor.

The powder coating composition of the present invention may further comprise UV absorbers, hindered amine lightstabilizers, and antioxidants in order to improve weather resistance of the coated film. The powder coating composition may also contain additives for modifying flowability or blocking resistance of the coating composition, or appearance or blocking resistance of the coated film, such as silicone compounds, Aerosil, and resin particles.

When using resin particles as an blocking inhibitor, a powder of the resin particles is generally added and mixed into the powder coating composition which is prepared beforehand. The resin particles have a mean particle size of from 0.01 to 10 μm, preferably from 0.03 to 3 μm, a glass transition temperature of from 50° to 150° C., preferably from 70° to 120° C., and an SP value of from 9 to 15, preferably from 10 to 13.

The resin particles having a mean particle size of less than 0.01 μm is difficult to prepare. If the mean particle size of the resin particles is more than 10 μm, the addition amount of the resin particles becomes large because blocking inhibiting ability becomes poor, and appearance of the coated film may become poor. If the glass transition temperature is less than 50° C., blocking inhibiting ability becomes poor, and is more than 150° C., it cannot be used practically. If the SP value is out of the above range, compatibility with the powder coating composition becomes poor, and appearance of the coated film may be damaged.

An addition amount of the resin particles is not particularly limited, but generally is 0.05 to 20 parts, preferably 0.1 to 10 parts by weight, based on 100 parts by weight of the powder coating composition. If the addition amount of the resin particles is more than 20 parts by weight, the appearance of the resulting coated film may become poor, and if it is less than 0.05 parts by weight, the blocking inhibiting ability may become poor.

The powder coating composition of the present invention preferably does not contain blocked isocyanate as a curing agent. If blocked isocyanate is employed, the resulting cured coated film may readily become yellow. Furthermore, the blocking agent which blocks an isocyanate group, vaporizes when the coating composition is baked. As a result, pinholes may be generated on the resulting cured coated film.

The powder coating composition of the present invention may be coated on a substrate by a static coating method and the like. The substrate may be optionally undercoated or intercoated. Any known coating composition for that use can be employed as the coating composition for undercoating or intercoating the substrate.

The powder coating composition of the present invention can be advantageously used for the substrate such as wood, metal, glass, fabric, plastic, foam, etc., particularly plastic and surface of metal such as steel, aluminum and alloys thereof. Generally, thickness of the coated film varies depending on the desired application. A film thickness of 20 to at 120 μm, preferably 40 to 100 μm, is useful in almost all cases.

After applying the coating composition on the substrate, the resulting coating is cured. A uniform cured coated film is formed by baking at 100° to 250° C., preferably 120° to 200° C. The curing time varies depending on the curing temperature used, but is usually for 15 to 45 minutes at 120° to 200° C.

In one preferred embodiment of the present invention, a coated film is provided according to the process which comprises the steps of:

applying an aqueous or solvent-based coating composition on an undercoated or intercoated substrate to form a base coating;

applying the clear powder coating composition of the present invention thereon to form a clear powder coating, without curing the base coating; and heating and curing both the base coating and the clear powder coating.

The base coating composition employed in the method is not particularly limited, but is preferably the aqueous coating composition which comprises:

(a) 95 to 10% by weight (solid) of a film forming vinyl polymer obtained by at least partially neutralizing an acidic group of a copolymer having a number average molecular weight of 6000 to 50,000, prepared by copolymerizing 5 to 40% by weight of an amide group-containing monomer, 3 to 15% by weight of an acidic group-containing monomer, and remainder amount of the other monomers; and (b) 5 to 90% by weight (solid) of a urethane-containing aqueous dispersion obtained by dispersing a hydrophilic group-containing oligomer into an aqueous medium which contains primary polyamine, secondary polyamine, or both of them; the hydrophilic group-containing oligomer being prepared by reacting, in a condition rich in isocyanate, a diol having a terminal hydroxyl group having a molecular weight of 100 to 5000, a diisocyanate, and a compound having both at least one active hydrogen and a hydrophilic group.

EXAMPLES

The following Synthetic Examples, Examples and Comparative Examples further illustrate the present invention in detail but are not to be construed to limit the scope thereof. In the Synthesis Examples, Examples and Comparative Examples, "parts" are by weight unless otherwise stated.

The methods for measuring the characteristic value of the powder coating composition of the present invention is described below.

Molecular Weight

A polymer solution of the sample was analyzed by using gel permeation chromatography (GPC) and the number average molecular weight was calculated based on the molecular weight of polystyrene.

SP Value

The SP value was measured according to the turbid point titration method described in Sub & Clarke, J. Polymn. Sci., A-1, 5, pages 1671–1681, 1967, using a tetrahydrofuran (THF) solvent at a measuring temperature of 20° C.

Glass Transition Temperature

The glass transition temperature was measured according to differential scanning calorimetry (DSC).

Particle Size of the Ground Coating Composition

The weight average particle size was measured by using Microtrack "MK-2" (manufactured by Nikkiso K.K.) and integrated the value by 50% and averaged.

Particle Size of the Resin Particles

The weight average particle size was measured according to laser light scattering method (Coulter Model N4) by using an emulsion of the resin particles.

Synthetic Example 1

Synthesis of epoxy group-containing acrylic resin (acrylic polyepoxide) (A)

Into a reaction vessel equipped with a thermometer, a stirrer, a cooling tube, a nitrogen introducing tube and a dropping funnel, 63 parts of xylene was charged and heated to 130° C. To the vessel, a monomer mixture consisting of 45 parts of glycidyl methacrylate, 20 parts of stylene, 27 parts of methyl methacrylate, and 8 parts of isobutyl methacrylate; and an initiator solution consisting of 6.5 parts of t-butylperoxy-2-ethyl hexanoate, and 6 parts of xylene are dropwise added respectively over 3 hours.

After that, the reaction vessel was left at the temperature for 30 minutes, and an initiator solution consisting of 0.1 parts of t-butylperoxy-2-ethyl hexanoate and 7 parts of xylene was added dropwise over 30 minutes. After an end of the addition, the reaction vessel was further left at 130° C. for 1 hour. Xylene was then removed by distillation under reduced pressure, and acrylic resin A-1 which has a SP value of 11.3, and a Tg of 52° C. was obtained.

Synthetic Examples 2 to 6

Acrylic polyepoxides A-2 to A-6 were prepared according to substantially the same manner as described in Synthetic Example 1, except that the compositions tabulated in the following Table 1 were used.

TABLE 1

| Acrylic polyepoxide (A) | | A-1 | A-2 | A-3 | A-4 | A-5 | A-6 |
|---|---|---|---|---|---|---|---|
| Monomer (a) | GMA | 45 | 40 | 60 | 40 | 45 | 45 |
| | α-MGM | — | 5 | — | — | — | — |
| Monomer (b) | ST | 20 | 20 | 23.5 | 13.2 | 21.2 | 1.5 |
| | MMA | 27 | 27 | 8.5 | 33 | 28.4 | 13 |
| | iBMA | 8 | 8 | 8 | 8 | — | 8 |
| | nBMA | — | — | — | 5.8 | 5.4 | 32.5 |
| SP value | | 11.3 | 11.5 | 11.3 | 11.3 | 11.3 | 11.2 |
| Tg (°C.) | | 52 | 53 | 43 | 50 | 51 | 30 |

GMA: glycidyl methacrylate
α-MGM: α-methyl glycidyl methacrylate
ST: styrene
MMA: methyl methacrylate
iBMA: isobutyl methacrylate
nBMA: n-butyl methacrylate

Synthetic Example 7

Synthesis of surface modifier (D)

Into a reaction vessel equipped with a thermometer, a stirrer, a cooling tube, a nitrogen introducing tube and a dropping funnel, 90 parts of xylene was charged and heated to 120° C. To the vessel, a monomer mixture consisting of 50 parts of ethyl acrylate, 50 parts of n-butyl acrylate, and 3 parts of t-butylperoxy-2-ethyl hexanoate are dropwise added over 3 hours.

After that, the reaction vessel was left at the temperature for 30 minutes, and an initiator solution consisting of 0.3 parts of t-butylperoxy-2-ethyl hexanoate and 10 parts of xylene was added dropwise over 30 minutes. After the end of the addition, the reaction vessel was further left at 120° C. for 2 hour. Xylene was then removed by distillation under reduced pressure, and surface modifier D-1 which has a SP value of 10.7, and a number average molecular weight of 6000 was obtained.

Synthetic Examples 8 to 10

Surface modifiers D-2 to D-4 were prepared according to substantially the same manner as described in Synthetic Example 7, except that the compositions tabulated in the following Table 2 were used.

TABLE 2

| Surface modifier (D) | D-1 | D-2 | D-3 | D-4 |
|---|---|---|---|---|
| Ethyl acrylate | 50 | 50 | 50 | 70 |
| n-Butyl acrylate | 50 | 50 | 50 | 30 |
| t-Butylperoxy-2-Ethyl hexanoate | 3 | 6 | 2.6 | 3 |
| SP value | 10.7 | 10.7 | 10.7 | 10.9 |
| Mn | 6000 | 3000 | 7000 | 6000 |

Synthetic Example 11

Preparation of resin particles

Into a reaction vessel equipped with a stirrer, a cooler, and a heater, 380 parts of deionized water, and 2 parts of nonionic surfactant "MON 2" (manufactured by Sanyo Kasei K.K.) were charged, heated to 80° C. and stirred until the solution becomes homogeneous. A polymerization initiator solution consisting of 1 part of ammonium persulfate, and 10 parts of deionized water, was then added to the solution.

A solution consisting of 61 parts of methyl methacrylate, 36 parts of stylene, and 3 parts of butyl methacrylate was added dropwise to the reaction vessel over 60 minutes. After an end of the addition, the reaction mixture was stirred at 80° C. for 60 minutes, and the emulsion having a nonvolatile content of 20%, and a particle size of 0.03 to 0.05 μm. The emulsion was dried by spraying to obtain the resin particles having a SP value of 10, a glass transition temperature of 110° C., a mean particle size of 0.03 to 0.05 μm.

Example 1

Preparation of powder resin composition

100 Parts of acrylic polyepoxide A-1, 27.3 parts of decanedicarboxylic acid, 1.27 parts of 2,6-di-t-butyl-4-methylphenol, 2.54 parts of tris-(4-t-butylphenyl) phosphite, and 0.76 parts of surface modifier D-1 were mixed. The resulting mixture was melted and kneaded by using "Co-kneader PR-46" (manufactured by Bus in Swizerland), extruded, and cooled to obtain a solid coating composition.

The composition was grounded ultra centrifugally by using "Ultra centrifugal grinder" manufactured by Mitamura Riken K.K., and classified (150 mesh). 0.2 Parts of "Aerosil R-974" manufactured by Nippon Aerosil K.K. was added to 100 parts of the resulting powder, and well mixed to obtain powder coating composition I having a mean particle size of 25 μm.

Color difference and blocking resistance of the resulting powder coating composition were evaluated according to the following procedure. The results are shown in Tables 3 and 4.

Color Difference

The powder coating composition was directly coated on a white panel such that the coating thickness has a gradient, followed by baking at 150° C. for 25 minutes to prepare a coated white panel. The b values of the coated white panel in which the thickness of the clear coated film is 60 μm, were measured by using the SM color computer "SM-4" manufactured by Suga Sikenki K.K. The difference of the measured b values from those of the uncoated white panel was obtained as color difference (Δb).

Blocking Resistance

The powder coating composition was filled in a 50 ml jar, and left at 30° C. for 2 months. After that, the content was took out and inspected whether agglomerates are present or not. Evaluation was carried out according to the following criteria.

⊙: No mass was found, the powder showed excellent flow;

○: Certain re-pulverizable masses were found;

x: Many unpulverizable masses were found.

Example 2, and Comparative Examples 1 and 11

Powder coating compositions II, XII, and XVII were prepared according to substantially the same manner as described in Example 1, except that the compositions tabulated in the following Table 3 and 4 were used. The mean particle sizes of the resulting powder coating compositions were shown in Tables 3 and 4.

Examples 3 to 10, and Comparative Examples 2 to 4

Powder coating compositions III to X, and XIII to XV were prepared according to substantially the same manner as described in Example 1, except that the compositions tabulated in the following Table 3 and 4 were used, and the solid coating composition was jet-ground by using "Labo Jet LJ-N" manufactured by Nippon Pneumatic K.K. The mean particle sizes of the resulting powder coating compositions were shown in Tables 3 and 4.

Example 11

2 Parts of the resin particles obtained in Synthetic Example 11 were added to 100 parts of powder coating composition IV obtained in Example 4, and the resulting composition was dry mixed by using "Henshel mixer" (manufactured by Mitsui-miike Seisakusho). Powder coating composition XI which has resin particles stuck on the surface of the coating particles of the coating composition, was obtained.

Comparative Example 5

2 Parts of the resin particles obtained in Synthetic Example 11 were added to 100 parts of powder coating composition XV obtained in Comparative Example 4, and the resulting composition was dry mixed by using "Henshel mixer". Powder coating composition XVI which has resin particles stuck on the surface of the coating particles of the coating composition, was obtained.

TABLE 3

| Examples | 1 | 2 | 3 | 4 | 5 | 6 | 7 | 8 | 9 | 10 | 11 |
|---|---|---|---|---|---|---|---|---|---|---|---|
| Composition No. | I | II | III | IV | V | VI | VII | VIII | IX | X | XI |
| Acrylic polyepoxide (A) | A-1 | A-2 | A-3 | A-4 | A-5 | A-5 | A-6 | A-1 | A-1 | A-1 | A-4 |
|  | 100 | 100 | 100 | 100 | 100 | 100 | 100 | 100 | 100 | 100 | 100 |
| Decanedicarboxylic acid | 27.3 | 24.3 | 36.4 | 24.3 | 24.3 | 27.3 | 27.3 | 27.3 | 27.3 | 27.3 | 24.3 |
| Phenol antioxidant | AO-1 | AO-2 | AO-3 | AO-4 | AO-4 | AO-4 | AO-5 | AO-5 | AO-5 | — | AO-4 |
|  | 1.27 | 1.24 | 1.36 | 1.24 | 1.24 | 1.27 | 1.27 | 1.27 | 1.27 | — | 1.24 |
| Phosphite antioxidant | AO-6 | AO-7 | AO-8 | AO-8 | AO-9 | AO-10 | AO-6 | AO-8 | — | AO-8 | AO-8 |
|  | 2.54 | 2.48 | 2.72 | 2.48 | 2.48 | 2.54 | 2.54 | 2.54 | — | 2.54 | 2.48 |
| Surface modifier (D) | D-1 | D-1 | D-1 | D-1 | D-1 | D-1 | D-1 | D-2 | D-3 | D-4 | D-1 |
|  | 0.76 | 0.75 | 0.82 | 0.75 | 0.75 | 0.76 | 0.76 | 0.76 | 0.76 | 0.76 | 0.75 |
| Polysiloxane | 0.16 | 0.15 | 0.17 | 0.15 | 0.15 | 0.16 | 0.16 | 0.16 | 0.16 | 0.16 | 0.15 |
| Benzoin | 0.64 | 0.62 | 0.68 | 0.62 | 0.62 | 0.64 | 0.64 | 0.64 | 0.64 | 0.64 | 0.62 |
| Resin particles | — | — | — | — | — | — | — | — | — | — | 2* |
| Particle size (μm) | 25 | 24 | 11 | 11 | 11 | 10 | 12 | 10 | 10 | 10 | 11 |
| Color difference (Δ b) | 0.22 | 0.18 | 0.16 | 0.15 | 0.18 | 0.18 | 0.17 | 0.15 | 0.30 | 0.25 | 0.15 |
| Blocking resistance | ○ | ○ | ○ | ○ | ○ | ○ | ○ | ○ | ○ | ○ | ⊙ |

TABLE 3-continued

| Examples | 1 | 2 | 3 | 4 | 5 | 6 | 7 | 8 | 9 | 10 | 11 |
|---|---|---|---|---|---|---|---|---|---|---|---|

AO-1: 2,6-di-t-butyl-4-methylphenol (m.p. 71° C.);
AO-2: n-octadecyl-3-(3,5-di-t-butyl-4-hydroxyphenyl) propionate (m.p. 50° C.);
AO-3: tetrakis-{methylene-3-(3,5-di-t-butyl-4-hydroxyphenyl) propionate} methane (m.p. 115° C.);
AO-4: 3,9-bis-[2-{3-(3-t-butyl-4-hydroxy-5-methylphenyl) propionyloxy}-1,1-dimethylethyl]-2,4,8,10-tetraoxaspiro{5,5}undecane (m.p. 125° C.);
AO-5: 1-[2-{3-(3,5-di-t-butyl-4-hydroxyphenyl) propionyloxy}ethyl]-4-{3-(3,5-di-t-butyl-4-hydroxyphenyl) propionyloxy} -2,2,6,6-tetramethylpiperidine (m.p. 135° C.);
AO-6: tris-(4-t-butylphenyl) phosphite (m.p. 75° C.);
AO-7: tris-(4-phenylphenyl) phosphite (m.p. 92° C.);
AO-8: tris-(2-phenylphenyl) phosphite (m.p. 96° C.);
AO-9: tris-(2-t-butyl-4-methylphenyl) phosphite (m.p. 110° C.);
AO-10: tris-(2-t-butyl-5-methylphenyl) phosphite (m.p. 111° C.).
*The amount is based on 100 parts by weight of the powder resin composition.

TABLE 4

| Comp. Examples | 1 | 2 | 3 | 4 | 5 | 11 |
|---|---|---|---|---|---|---|
| Composition No. | XII | XIII | XIV | XV | XVI | XVII |
| Acrylic polyepoxide | A-5 | A-1 | A-1 | A-6 | A-6 | A-5 |
| (A) | 100 | 100 | 100 | 100 | 100 | 100 |
| Decanedicarboxylic acid | 27.3 | 27.3 | 27.3 | 27.3 | 27.3 | 27.3 |
| Phenol antioxidant | — | — | — | AO-4 | AO-4 | AO-1 |
|  | — | — | — | 1.27 | 1.27 | 1.27 |
| Phosphite antioxidant | — | AO-11 | AO-12 | AO-13 | AO-13 | AO-6 |
|  | — | 2.54 | 2.54 | 2.54 | 2.54 | 2.54 |
| Surface modifier | D-1 | D-4 | D-1 | D-1 | D-1 | D-1 |
| (D) | 0.76 | 0.76 | 0.76 | 0.76 | 0.76 | 0.76 |
| Polysiloxane | 0.16 | 0.16 | 0.16 | 0.16 | 0.16 | 0.16 |
| Benzoin | 0.64 | 0.64 | 0.64 | 0.64 | 0.64 | 0.64 |
| Resin particles | — | — | — | — | 2* | — |
| Blocked isocyanate | — | — | — | — | — | 6.15 |
| Particle size (μm) | 24 | 10 | 11 | 11 | 11 | 25 |
| Color difference (Δb) | 1.01 | 0.35 | 0.28 | 0.18 | 0.18 | 0.38 |
| Blocking resistance | ○ | × | ○ | ○ | ⊙ | ○ |

Example 12

Preparation of coated plate

A cationic electrodeposition coating composition (Powertop U-50, manufactured by Nippon Paint Co., Ltd.) and an intermediate coating composition (Orga P-2, manufactured by Nippon Paint Co., Ltd.) were coated on a phosphated steel plate having a thickness of 0.8 mm, so that a dry thickness thereof became 25 and 40 μm, respectively. An aqueous base coating composition (Example 1 of U.S. Pat. No. 5,183,504, manufactured by Nippon Paint Co., Ltd.) was air-sprayed on it so that a dry thickness became about 15 μm, followed by setting at 80° C. for 5 minutes to form a basecoated film.

Meanwhile, a formulation of the aqueous base coating composition is 56.2 parts of the acrylic resin varnish having a number-average molecular weight of 12000, a hydroxyl value of 70 mgKOH/g solid, an acid value of 58 mgKOH/g solid and a nonvolatile content of 50% obtained in Preparation Example 1 of the same reference, 15.0 parts of methyled melamine "Cymel 303" (manufactured by Mitsui Cytec Co., Ltd.), 21.5 parts of an urethane emulsion having an acid value of 16.2 mgKOH/g solid and a nonvolatile content of 33%, 7.5 parts of an aluminum pigment paste "Alpaste 7160N" having an aluminum flake content of 65% (manufactured by Toyo Aluminum Co., Ltd.) and 1.0 part of isostearic acid phosphate "Phosphorex A-180L" (manufactured by Sakai Kagaku Co., Ltd.).

Powder coating composition I obtained in Example 1 was coated static electrically by wet on wet method so that thickness of the powder clear coating became about 60 μm, followed by baking at 150° C. for 25 minutes to form a coated plate.

The performance of the resulting coated films was tested as follows. The results are shown in Table 5.

Appearance

A surface of the coated film was observed visually, and smoothness and gloss thereof were evaluated according to the following criteria.

○: good x: bad

Water Resistance

The coated film was dipped in tap water of 40° C. for 10 days, and thereafter, a surface of the coated film was observed visually and evaluated according to the following criteria.

○: No change is recognized.

x: Change is recognized.

Xylol Resistance

A surface of the coated film was rubbed back and forth 10 times by using a piece of gauze saturated with xylene, and thereafter, the surface of the coated film was observed visually and evaluated according to the following criteria.

○: No change is recognized.

x: Traces are recognized.

Example 13

Preparation of coated plate

A cationic electrodeposition coating composition (Powertop U-50, manufactured by Nippon Paint Co., Ltd.) and an intermediate coating composition (Orga P-2, manufactured by Nippon Paint Co., Ltd.) were coated on a phosphated steel plate having a thickness of 0.8 mm, so that a dry thickness thereof became 25 and 40 μm, respectively. A solvent type high-solid base coating composition (manufactured by Nippon Paint Co., Ltd.) was air-sprayed on it so that a dry thickness became about 16 μm, followed by setting for 7 minutes to form a basecoated film.

Meanwhile, a formulation of the solvent type high-solid base coating composition is 20 parts of an acrylic resin (nonvolatile content 80%, hydroxyl value 100 mgKOH/g solid, acid value 30 mgKOH/g solid, number-average molecular weight 1800) manufactured by Nippon Paint Co., Ltd., 30 parts of a polyester (nonvolatile content 80%, hydroxyl value 100 mgKOH/g solid, acid value 12 mgKOH/g solid, number-average molecular weight 2600)

manufactured by Nippon Paint Co., Ltd., 40 parts of a melamine resin "Cymel 202" (nonvolatile content 80%) manufactured by Mitsui Cytec Co., Ltd., 10 parts of a melamine resin "Cymel 327" (nonvolatile content 90%) manufactured by Mitsui Cytec Co., Ltd., "Alpaste Al 60-600" (nonvolatile content 65%) manufactured by Toyo Aluminum Co., Ltd. and 7 parts of isopropyl alcohol.

Powder coating composition I obtained in Example 1 was coated static electrically by a wet on wet method so that thickness of the powder clear coating became about 60 μm, followed by baking at 150° C. for 25 minutes to form a coated plate.

The performances of the resulting coated films were tested according to substantially the same manner as described in Example 12. The results are shown in Table 5.

Examples 14 to 23 and Comparative Examples 5 to 8

The coated plates are prepared in substantially the same manner as that described in Example 12, except that the coating compositions tabulated in the following Table 5 were used. The performance of the resulting coated films was tested in substantially the same manner as described in Example 12. The results are shown in Table 5.

TABLE 5

| Examples | Coating composition | | Appearance | Water resist. | Xylol resist. |
|---|---|---|---|---|---|
| | base | top (powder) | | | |
| 12 | aqueous | I | ○ | ○ | ○ |
| 13 | solvent | I | ○ | ○ | ○ |
| 14 | aqueous | II | ○ | ○ | ○ |
| 15 | aqueous | III | ○ | ○ | ○ |
| 16 | aqueous | IV | ○ | ○ | ○ |
| 17 | aqueous | V | ○ | ○ | ○ |
| 18 | aqueous | VI | ○ | ○ | ○ |
| 19 | aqueous | VII | ○ | ○ | ○ |
| 20 | aqueous | VIII | ○ | ○ | ○ |
| 21 | aqueous | IX | ○ | ○ | ○ |
| 22 | aqueous | X | ○ | ○ | ○ |
| 23 | aqueous | XI | ○ | ○ | ○ |
| Comp. 6 | aqueous | XII | ○ | ○ | ○ |
| Comp. 7 | aqueous | XIII | ⊚ | ○ | ○ |
| Comp. 8 | aqueous | XIV | × | ○ | ○ |
| Comp. 9 | aqueous | XV | ○ | × | ○ |
| Comp. 10 | aqueous | XVI | ○ | × | ○ |
| Comp. 12 | aqueous | XVII | × | ○ | ○ |

What is claimed is:

1. A powder coating composition comprising:
   (A) an epoxy group-containing acrylic resin prepared by polymerizing a monomer mixture which comprises,
      (a) 35 to 65% by weight of an epoxy group-containing ethylenically unsaturated monomer, and
      (b) remainder amount of an ethylenically unsaturated monomer which is different from the epoxy group-containing ethylenically unsaturated monomer;
   (B) a polycarboxylic acid; and
   (C) from 0.1 to 10 parts by weight based on 100 parts of the total weight of epoxy group-containing acrylic resin (A) and polycarboxylic acid (B) of an antioxidant having a melting point of from 50° to 140° C.

2. The powder coating composition according to claim 1, wherein the molar ratio of an epoxy group contained in the epoxy group-containing acrylic resin (A) to a carboxyl group contained in the polycarboxylic acid (B) is 10/10 to 10/5.

3. The powder coating composition according to claim 1, wherein the antioxidant (C) comprises a phosphite antioxidant.

4. The powder coating composition according to claim 1, wherein the antioxidant (C) comprises a combination of a phenol antioxidant and a phosphite antioxidant.

5. The powder coating composition according to claim 3, wherein the phosphite antioxidant is represented by the formula:

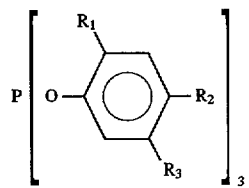

wherein, $R_1$ represents a hydrogen atom, a t-butyl group, or a phenyl group, $R_2$ represents a hydrogen atom, a methyl group, a t-butyl group, or a phenyl group, and $R_3$ represents a hydrogen atom, or a methyl group.

6. The powder coating composition according to claim 1, wherein the monomer mixture comprises 40 to 62% by weight of the epoxy group-containing ethylenically unsaturated monomer (a).

7. The powder coating composition according to claim 1, wherein the epoxy group-containing acrylic resin (A) has a SP value of from 11.0 to 11.6.

8. The powder coating composition according to claim 1, wherein the epoxy group-containing acrylic resin (A) has a glass transition temperature of not less than 20° C.

9. The powder coating composition according to claim 1, wherein the monomer mixture comprises 0.1 to 10% by weight of isobutyl methacrylate as the ethylenically unsaturated monomer (b) which is different from the epoxy group-containing ethylenically unsaturated monomer (a).

10. The powder coating composition according to claim 1, wherein the polycarboxylic acid is decanedicarboxylic acid.

11. The powder coating composition according to claim 1, wherein coating particles of the powder coating composition have a mean particle size of not more than 15 micron.

12. A clear powder coating composition comprising the powder coating composition according to claim 1 as a binder component.

13. The powder coating composition according to claim 4, wherein the phosphite antioxidant is represented by the formula:

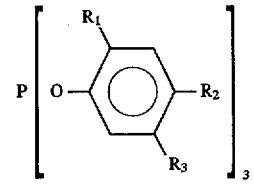

wherein, $R_1$ represents a hydrogen atom, a t-butyl group, or a phenyl group, $R_2$ represents a hydrogen atom, a methyl group, a t-butyl group, or a phenyl group, and $R_3$ represents a hydrogen atom, or a methyl group.

* * * * *